(12) United States Patent
de Almeida et al.

(10) Patent No.: US 12,150,591 B2
(45) Date of Patent: Nov. 26, 2024

(54) COMBINATION GRATE AND GRIDDLE FOR A GAS COOKTOP

(71) Applicant: WHIRLPOOL CORPORATION, Benton Harbor, MI (US)

(72) Inventors: Estevao Mascaro de Almeida, Stevensville, MI (US); Alok C. Deshpande, Pune (IN)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 408 days.

(21) Appl. No.: 17/493,017

(22) Filed: Oct. 4, 2021

(65) Prior Publication Data

US 2023/0108176 A1    Apr. 6, 2023

(51) Int. Cl.
| | | |
|---|---|---|
| A47J 36/36 | (2006.01) | |
| A47J 36/34 | (2006.01) | |
| A47J 37/06 | (2006.01) | |

(52) U.S. Cl.
CPC .......... *A47J 37/0682* (2013.01); *A47J 36/34* (2013.01)

(58) Field of Classification Search
CPC ...... A47J 37/0682; A47J 36/34; A47J 37/067; F24C 3/085; F24C 15/107
USPC ....... 126/214 C, 152 R, 152 B, 220; 99/422; 219/452.12; 108/50.13, 1; D7/408
See application file for complete search history.

(56) References Cited

U.S. PATENT DOCUMENTS

| | | |
|---|---|---|
| 10,240,800 B2 | 3/2019 | Todd et al. |
| 10,641,494 B2 | 5/2020 | Cadima |
| 2007/0068505 A1 | 3/2007 | Cadima |
| 2011/0067577 A1 | 3/2011 | Riddle et al. |
| 2012/0318256 A1 | 12/2012 | Chilton et al. |
| 2021/0131674 A1* | 5/2021 | Bardal .................. F24C 15/107 |
| 2021/0172607 A1* | 6/2021 | Cadima .................. F24C 3/082 |

FOREIGN PATENT DOCUMENTS

| | | |
|---|---|---|
| EP | 2336647 A2 | 6/2011 |
| EP | 3819547 A2 | 12/2021 |
| GB | 2292543 A | 2/1996 |

* cited by examiner

*Primary Examiner* — Avinash A Savani
(74) *Attorney, Agent, or Firm* — Price Heneveld LLP

(57) ABSTRACT

A combination grate and griddle for a cooking hob includes a base frame extending around a perimeter of the combination grate and griddle to define an open central area. At least one article supporting feature is connected with the base frame, extends at least partially into the open central area, and defines an upper supporting face. A griddle body is connected with the base frame and extends within the open central area around the at least one article supporting feature. The griddle body defines a cooking surface spaced apart from the upper supporting face of the at least one article supporting feature.

11 Claims, 7 Drawing Sheets

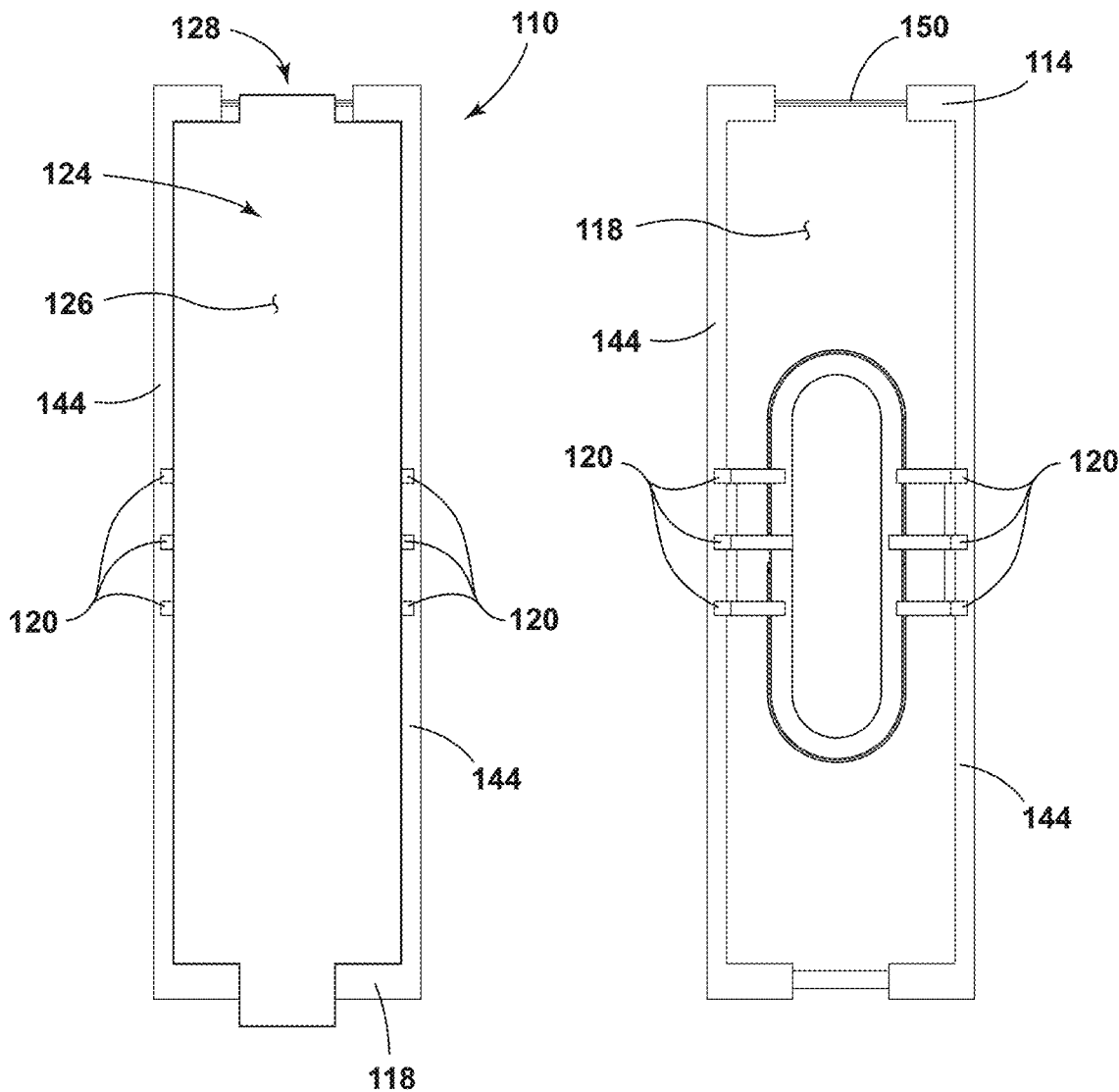
FIG. 12  FIG. 13
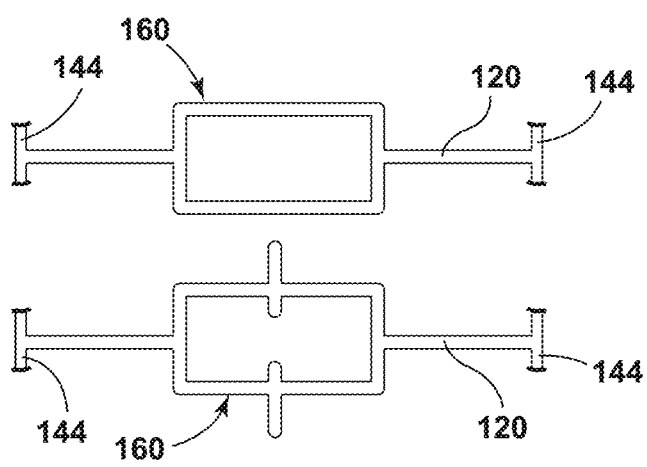
FIG. 14A
FIG. 14B

COMBINATION GRATE AND GRIDDLE FOR A GAS COOKTOP

BACKGROUND OF THE DISCLOSURE

The present disclosure generally relates to a combination grate and griddle for a cooktop, and more specifically, to a griddle supported on a base frame that includes elements defining a grate.

Various cooking hobs, whether stand-alone units or included within a range, include elongated central burners that can be used to heat various types of similarly elongated cooking articles, including oblong pans, Dutch ovens, casserole dishes, or the like. In this manner, one common elongated cooking article for use with an elongated central burner is a griddle, which may benefit from the configuration of the elongated central burner to provide generally even heating thereof. To this end, various griddles are made for use with cooktops, including stand-alone units that must be stored when not in use. Alternatively, many cooktop manufacturers provide integrated griddles that completely replace a central grate such that the griddle remains in place over the burner, which limits the use of the burner with respect to other elongated cooking articles, and may require storage of the grate when replaced.

SUMMARY OF THE DISCLOSURE

According to one aspect of the present disclosure, a combination grate and griddle for a cooking hob includes a base frame extending around a perimeter of the combination grate and griddle to define an open central area. At least one article supporting feature is connected with the base, extends at least partially into the open central area, and defines an upper supporting face. A griddle body is connected with the base frame and extends within the open central area around the at least one article supporting feature. The griddle body defines a cooking surface spaced apart from the upper supporting face of the at least one article supporting feature.

According to another aspect of the present disclosure, a cooking hob includes an upper cooktop surface, a cooking burner positioned on the upper cooktop surface, and a combination grate and griddle. The combination grate and griddle has a base frame defining two parallel short edges and two parallel long edges extending between the two parallel short edges and collectively extending around a perimeter of the combination grate and griddle to define an open central area. At least one article supporting feature is connected with the base from at least one of the two parallel long edges, extends at least partially into the open central area and at least partially over the cooking burner, and defines an upper supporting face. A griddle body is hingedly connected with one of the two parallel short edges of the base frame and is moveable between a use position with the griddle body extending within the open central area around the at least one article supporting feature and over the cooking burner and a storage position such that the griddle body is positioned out of the open central area and away from the cooking burner.

According to yet another aspect of the present disclosure, a combination grate and griddle for a cooking hob includes a base frame extending around a perimeter of the combination grate and griddle to define an open central area and a combined griddle and grate body supported within the open central area of the base frame, defining a cooking surface and at least one article supporting feature extending at least partially into the open central area, and defining an upper supporting face positioned above the cooking surface. The cooking surface defines at least one area configured for directly cooking a food item thereon that is uninterrupted by the at least one article supporting feature.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 12 is a top view of the combination griddle and grate in the use position;

FIG. 13 is a top view of the combination griddle and grate in the storage position;

FIGS. 14A and 14B are partial views of the grate of the combination griddle and grate showing alternative supporting element configurations thereof;

Figure 1:
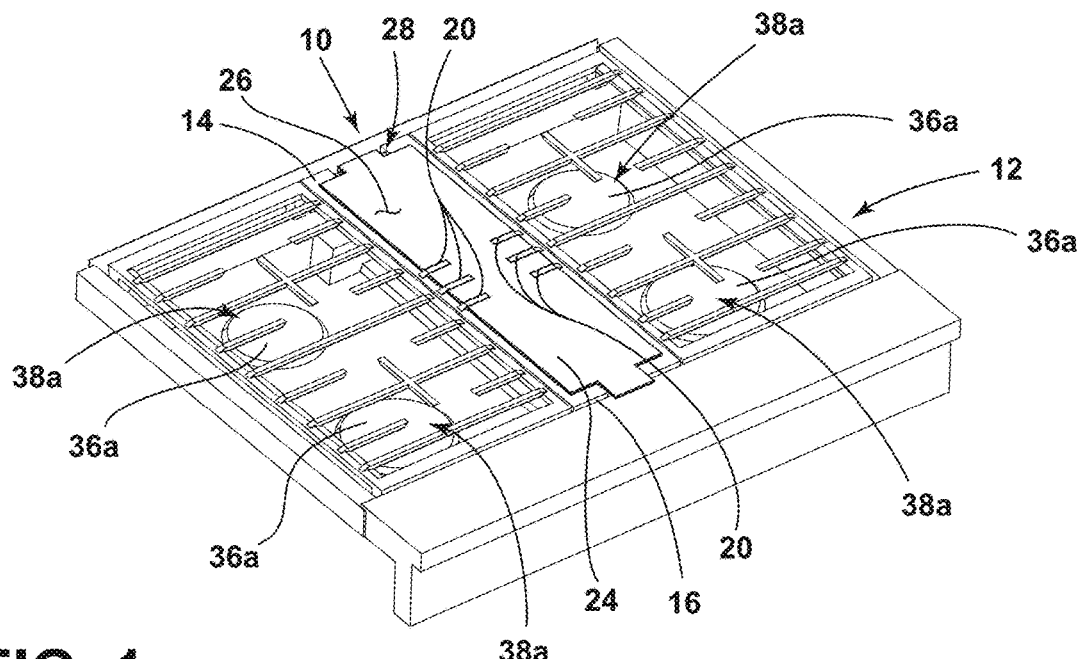
FIG. 1 is a perspective view of a combination griddle and grate in place on a cooking hob and with the griddle shown in a use position.

The components in the figures are not necessarily to scale, emphasis instead being placed upon illustrating the principles described herein.

DETAILED DESCRIPTION

The present illustrated embodiments reside primarily in combinations of method steps and apparatus components related to a combination griddle and grate. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-8, reference numeral 10 generally designates a combination grate and griddle for a cooking hob 12. The combination grate and griddle 10 includes a base frame 14 extending around a perimeter 16 of the combination grate and griddle 10 to define an open central area 18. At least one article supporting feature, also referred to as article support, 20 is connected with the base frame 14, extends at least partially into the open central area 18, and defines an upper supporting face 22. A griddle body 24 is connected with the base frame 14 and extends within the open central area 18 around the at least one article supporting feature 20. The griddle body 24 defines a cooking surface 26 spaced apart from the upper supporting face 22 of the at least one article supporting feature 20.

Figure 2:
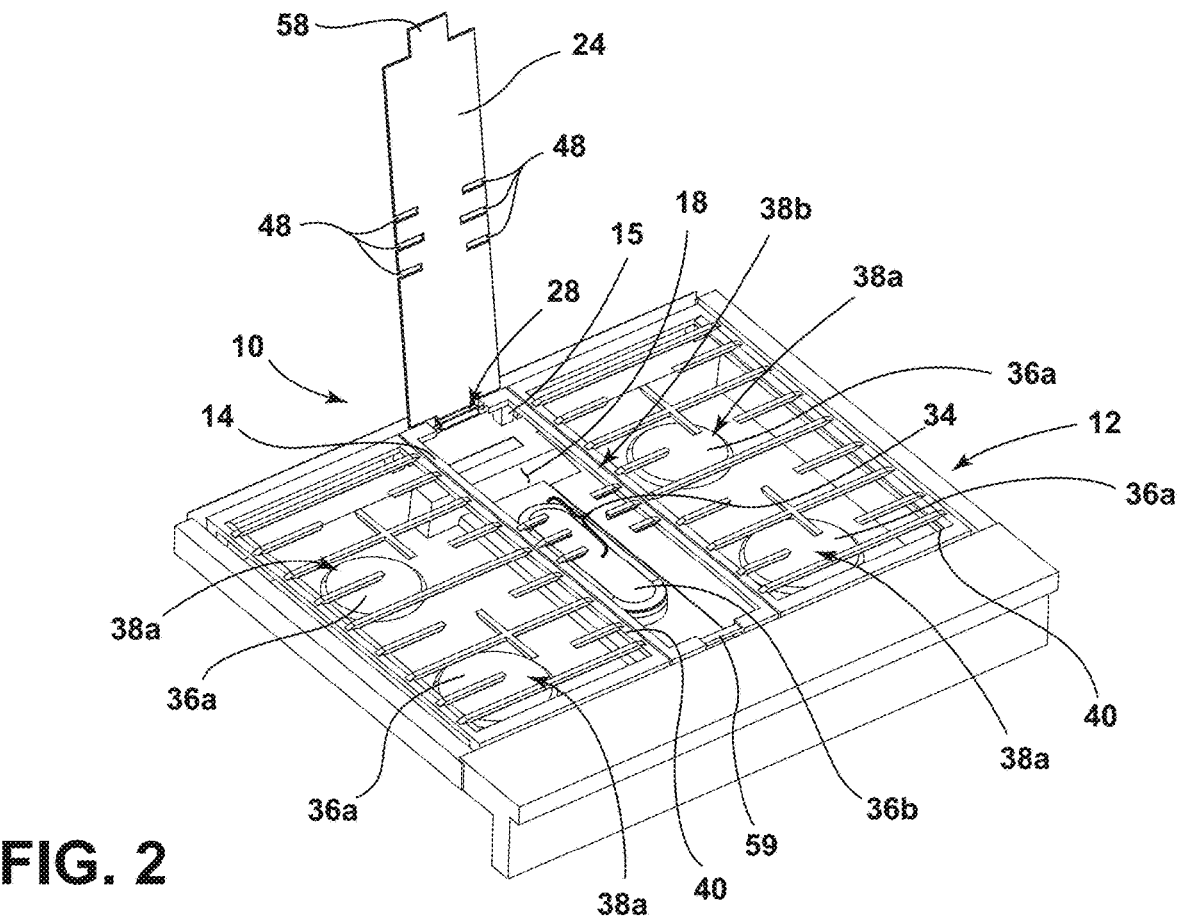
FIG. 2 is a perspective view of the combination griddle and grate of FIG. 1 with the griddle shown in a storage condition.

As shown in FIGS. 1 and 2, the combination grate and griddle 10, according to the present aspect of the disclosure, is useable in connection with a cooking hob 12 that includes an upper cooking surface 26 and a plurality of cooking burners 36, which include a number of standard round burners 36a in four respective corner cooking zones 38a of the cooking surface 26. Additionally, one of the cooking burners 36 is in the form of an elongate central burner 36b that is disposed within a central cooking zone 38b that extends generally from the front of the cooking surface 26 to the back thereof, between the respective corner cooking zones 38a disposed on the left and right sides of the cooking surface 26. In this manner, the combination grate and griddle 10 described herein is, in one aspect, positionable within the central cooking zone 38b to be useable over and in connection with the central cooking burner 36b. The open central area 18 of the base frame 14 can be positioned over the central cooking burner 36b with the base frame 14 generally surrounding the central cooking zone 38b. The base frame 14 can further be configured to vertically (i.e. in a direction normal to and away from the cooking surface 26) align with one or more outer grates 40 positioned over the round burners 36a within the outer corner cooking zones 38a. In the example shown in FIGS. 1 and 2, the cooking hob 12 includes two outer grates 40 that extend from the front of the cooking surface 26 to the back of the cooking surface 26 to extend over two of the round burners 36a on each side of the cooking hob 12, although other arrangements are possible. The combination grate and griddle 10 can further include a plurality of legs 15 extending from the base frame 14 to support the base frame 14 above the central burner 36a. As depicted, the burners 36 are in the form of gas burners such that the hob 12 is generally regarded as a gas cooking hob 12.

As shown, the base frame 14 of the combination grate and griddle 10 fits closely between the adjacent outer grates 40 to provide a generally consistent appearance. In particular, the base frame 14 defines two parallel short edge members 42 and two parallel long edge members 44 extending between the two parallel short edge members 42. The short edge members 42 and long edge members 44 collectively extend around and define a perimeter of the combination grate and griddle 10 and surround the open central area 18. In the present example the article supporting features 20 are connected with the base frame 14 from the two parallel long edges 44. In this manner, the article supporting features 20 extend only partially into the open central area 18 and only partially over the central cooking burner 36b. More particularly, in the illustrated example, the article supporting features 20 are arranged in pairs that extend inward from respective ones of the parallel long edge members 44 from locations opposite each other. In this manner, each of the article supporting features 20 in the respective pairs extend toward each other leaving a gap 46 over the central cooking burner 36b. This arrangement allows for the article supporting features 20 to collectively, and in connection with base frame 14, act as a grate for supporting cooking articles, such as pots and pans over central cooking burner 36b. In some aspects, the article supporting features 20 can be arranged to provide sufficient support, at the upper faces 22 thereof, for elongate cooking articles, such as oval pans, Dutch ovens, and the like, that are particularly suited for heating with the depicted elongate central burner 36b.

Further, by being structured to define the depicted gap 46, the depicted griddle body 24 can set into the open area 18 within the parallel short edge members 42 and the parallel long edge members 44 by defining cutouts 48 respectively surrounding the article supporting features 20. In this manner, the griddle body 24 can be positioned with the cooking surface 26 just below, or generally even with, the upper faces 22 of the article supporting features 20, while implementing the depicted single-piece configuration.

As shown in FIGS. 1 and 2, the griddle body 24 can be hingedly connected with the base frame 14 so as to be moveable out of the open central area 18 from the use position shown in FIG. 1 and into the upward-stored position shown in FIG. 2. More particularly, as discussed above, the griddle body 24 is hingedly connected with one of the two parallel short edges 42 of the base frame 14 (more specifically, the rear short edge 42). In this manner the griddle body 24 is moveable between a use position, shown in FIG. 1, and a storage position, shown in FIG. 2. In the storage position, the griddle body 24 extends within the open central area 18 around the at least one article supporting feature 20 and over the central cooking burner 36b, as discussed above with respect to FIG. 1. As shown in FIG. 2, in the storage position the griddle body 24 is positioned out of the open central area 18 and away from the central cooking burner 36b. As discussed above, when the griddle body 24 is in the storage position, the article supporting features 20 can collectively define a grate portion 34 that allows the base frame 14 to be used as a grate to support other cooking articles over the central cooking burner 36b for thereof in heating such cooking articles. The depicted arrangement allows for the griddle body 24 to be stored for temporary non-use without fully removing the griddle body 24 from the base frame 14 such that the griddle body 24 does not take up counter or cabinet space and can be easily used, when desired, by movement back into the use position of FIG. 1.

Figure 3:
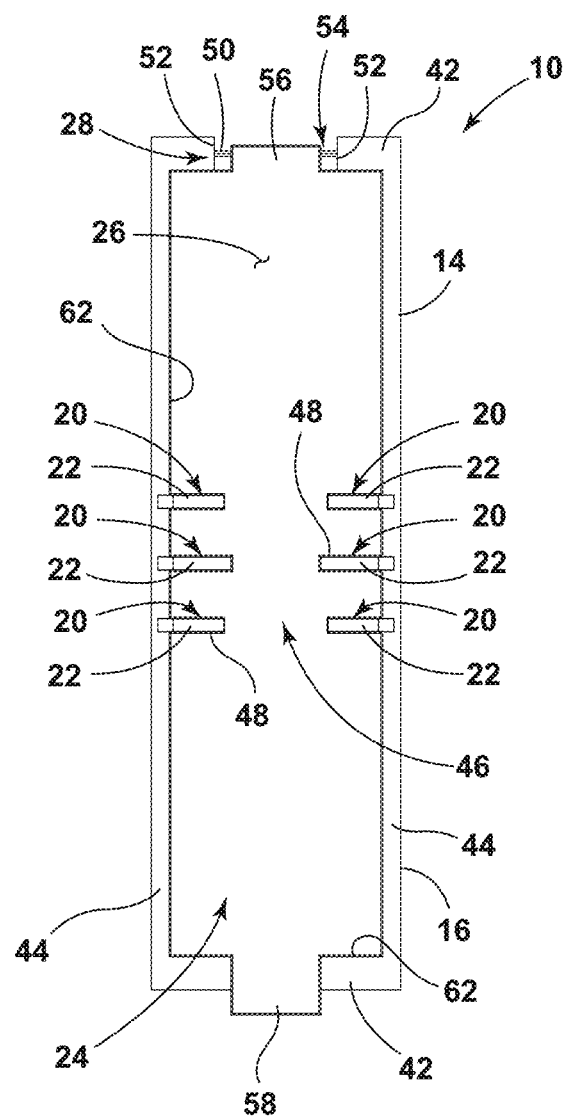
FIG. 3 is a top view of the combination griddle and grate.
Figure 4:
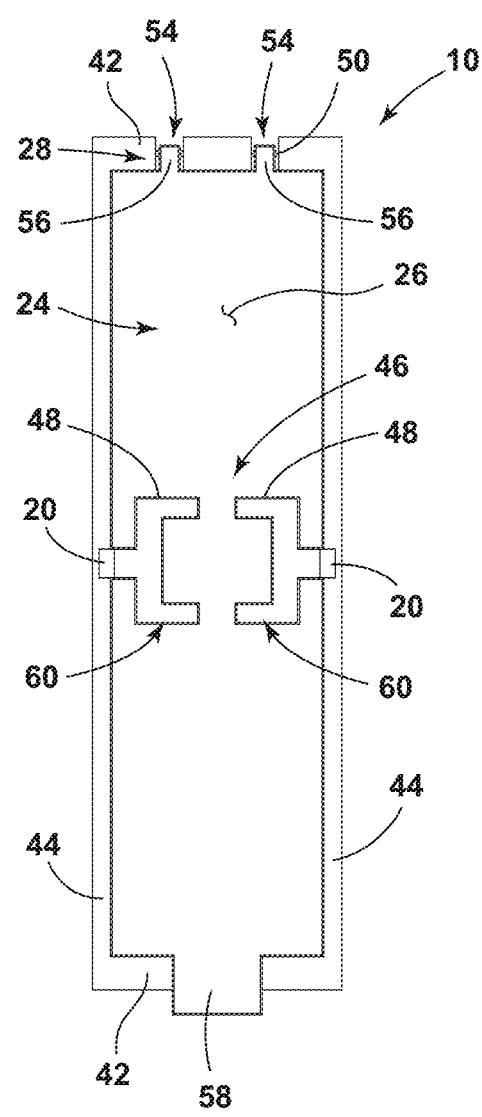
FIGS. 4-6 are top views of the combination griddle and grate with various alternative interacting configurations of the griddle and grate.

In various examples, the hinge 28 can include a pin 50 that extends between hinge portions 52 of the base frame 14 (particularly within a notch 54 in the rear short edge member 42). The pin 50 further extends through a hinge tab 56 of the griddle body 24 that is positioned between the hinge portions 52, as shown in FIGS. 2 and 3. The notch 54, pin 50 and the adjacent edge or other portion of the griddle body 24 can be configured such that the griddle body 24 contacts the rear short edge member 42 when the griddle body 24 is in the storage position such that the griddle body 24 rests against the rear short edge member 42 and is supported generally upright (with a slightly rearward lean) when in the storage position. This configuration can be such that the griddle body 24 remains in the storage position, including when inadvertently contacted, until deliberately pulled forward/downward by the use in movement of the griddle body 24 into the use position, including rotation thereof about the pin 50. Other arrangements of the hinge mechanism are possible, including as depicted in FIG. 4, wherein the rear short edge member 42 defines multiple notches 54 with corresponding tabs 56 of the griddle body 24 extending respectively into the notches 54. Still further arrangements are possible, including ones without a pin 50 such that the griddle body 24 can be easily removed from the base frame 14 for cleaning, for example. In one such example, the rear short edge member 42 can define a generally U-shaped channel extending across the notch 54, with the tab 56 defining a convex bead that engages with the U-shaped channel. These features can include mating undercuts, for example, to retain engagement therebetween when the griddle body 24 is in the stored position and can provide the resting support for the griddle body 24 in a similar manner to that which is discussed above.

In a further arrangement, the griddle body 24 can define a lift tab 58 extending over a front one of the parallel short edge members 42. The lift tab 58 can extend forward of the front short edge member 42 to provide a feature for the user to lift the front edge of the griddle body 24 for movement into the stored position. Similarly, the lift tab 58 can be used in lowering the griddle body 24 into the use position to maintain the finger(s) of the user away from the area between the front short edge member 42 and the underside of the griddle body 24. The lift tab can additionally provide support for the griddle body 24 on the base frame 14 when the griddle body 24 is in the use position (FIG. 2), including by resting within a front notch 59 defined in the front short edge member 42.

Figure 5:
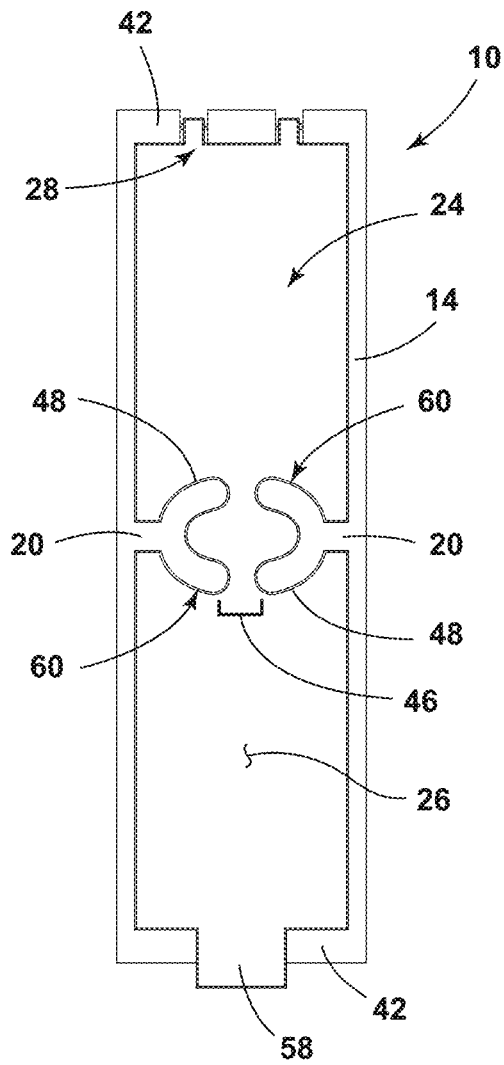
Figure 6:
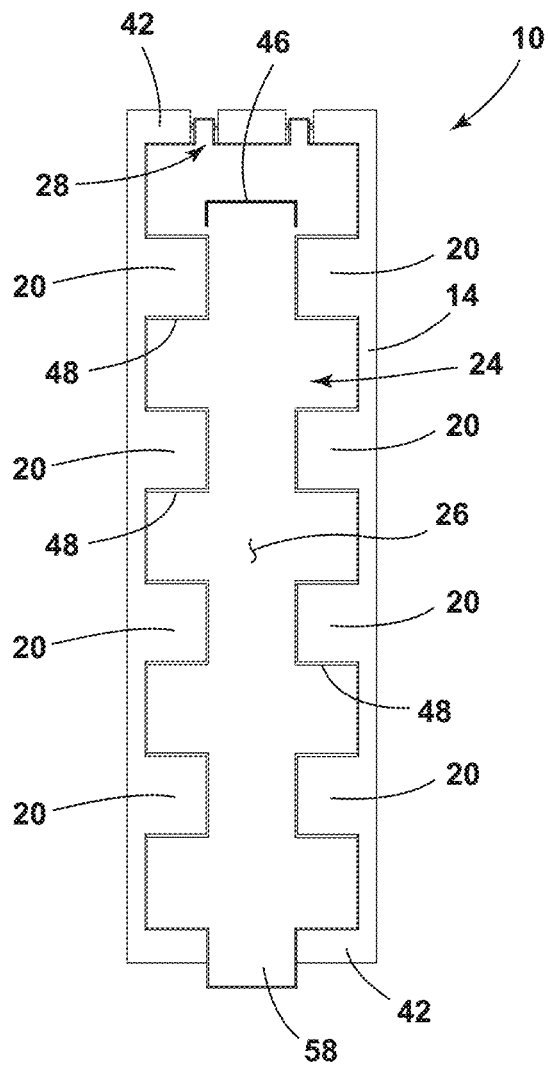

The at least one article supporting feature 20 can be configured differently from the arrangement shown in FIGS. 1-3, including for various supporting and aesthetic configurations. To maintain the single piece arrangement of the griddle body 24 discussed above, such article supporting features 20 are configured to be connected with the base frame 14 at respective ones of the two parallel long edge members 44 and to extend inwardly into the open area 18 while maintaining some configuration of a gap 46 therebetween. As shown in FIGS. 4 and 5, such arrangements can include two article supporting features 20 that each extend from respective ones of the two parallel long edge members 44 at single locations. The article supporting features 20 can then branch in various central portions 60 with various U-shaped configurations. The U-shaped configurations of the central portions 60 can vary in size and shape (round, rectangular, or otherwise, for example), while maintaining the desired gap 46 therebetween. The cutouts 48 in the griddle body 24 can be shaped similarly to whichever configuration of article supporting features 20 is used to maintain the nesting arrangement consistent with the principles of the present aspect of the disclosure. In a further variation, as shown in FIG. 6, a plurality of article supporting features 20 can extend inwardly at evenly-spaced intervals along the entireties of the parallel long edge members 44. The article supporting features 20 can have respective widths generally equal to the spacing intervals, which can also be the same as the width of the gaps 46 defined between adjacent ones of the article supporting features 20 that extend respectively from ones of the parallel long edge members 44. The griddle body 24 can, accordingly, be defined with a series of cutouts 48 corresponding to respective ones of the article supporting features 20 in a similar configuration.

Figure 7:
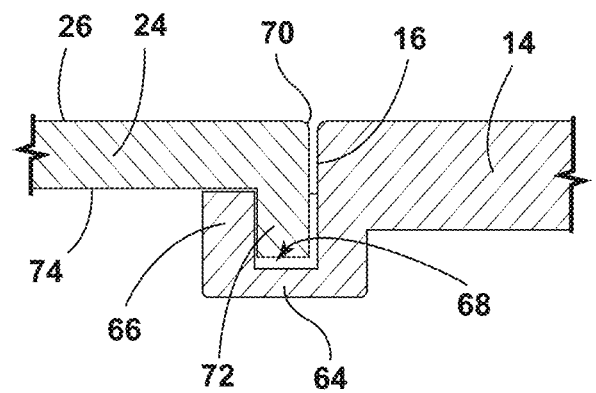
FIG. 7 is a cross-section view of an interacting edge profile according to an implementation of the combination griddle and grate.
Figure 8:
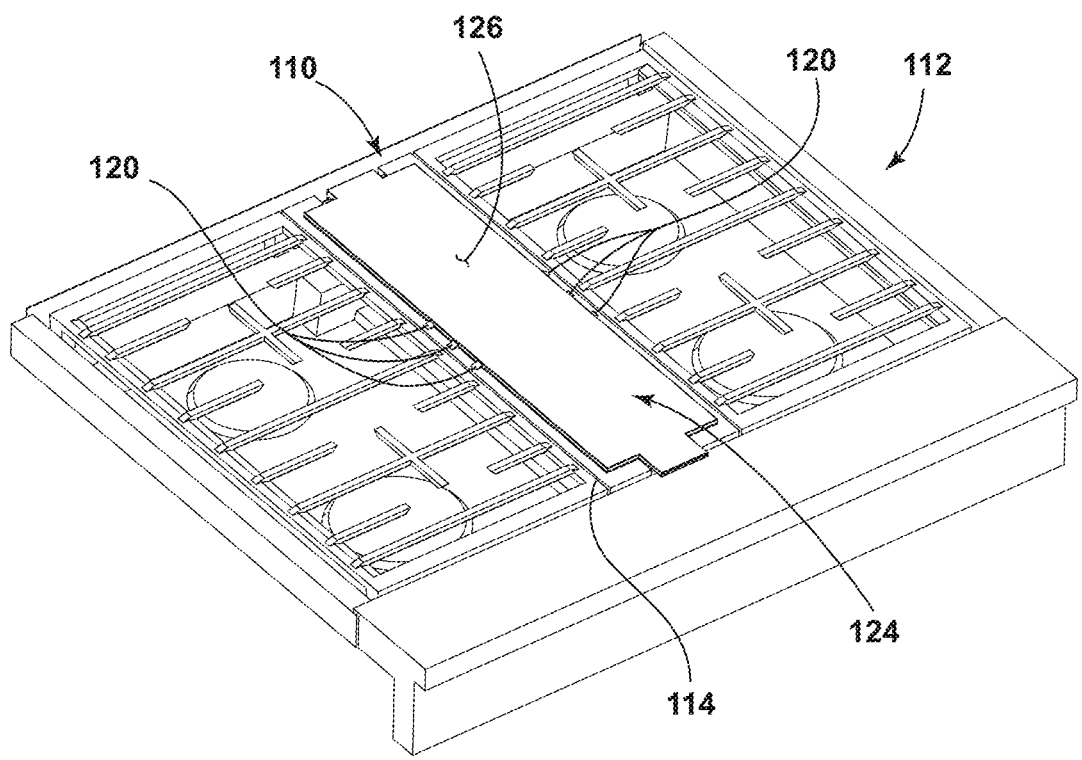
FIG. 8 is a perspective view of an alternative combination griddle and grate in place on a cooking hob and with the griddle shown in a use position.
Figure 9:
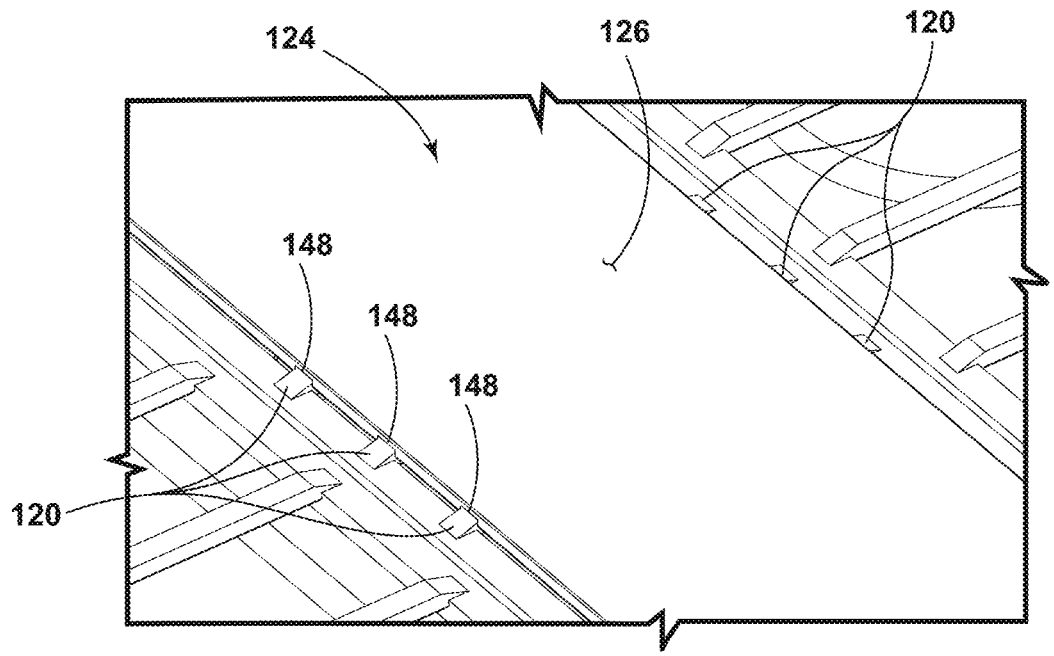
FIG. 9 is a detail view of a portion of the combination griddle and grate of FIG. 8.

As shown in FIG. 7, in another aspect, regardless of the particular configuration of article supporting features 20 and cutouts 48, the inward-facing edges 62 of the parallel short edge members 42 and the parallel long edge members 44 can define an inwardly-directed extension 64 with an upwardly-extending lip 66 that defines a drip channel 68 on an upwardly-directed interior of the extension 64. The drip channel 68 can, thusly, be configured to catch any liquid material that runs off of the perimeter 70 of the griddle body 24. In this manner, the drip channel 68 can be configured to angle downwardly toward the front of the griddle body 24 such that the liquid can collect in a location for easy cleaning or removal thereof. The drip channel 68 can further be configured to extend inwardly such that the perimeter 70 of the griddle body 24 is positioned over a portion of the drip channel 68. In certain embodiments, the drip channel 68 may also extend around the lower edges of the article supporting feature 20. As further shown in FIG. 7, the griddle body 24 can define a bead 72 extending downwardly from the lower surface 74 of the griddle body 24 and partially into the drip channel 68. This arrangement can cause liquid runoff to detach from the griddle body 24 at an apex of the bead 72 to prevent surface tension of such liquid (some of which can be highly viscous) from carrying the liquid flow inwardly past the drip channel 68 such that it falls onto the cooking surface 26.

Figure 10:
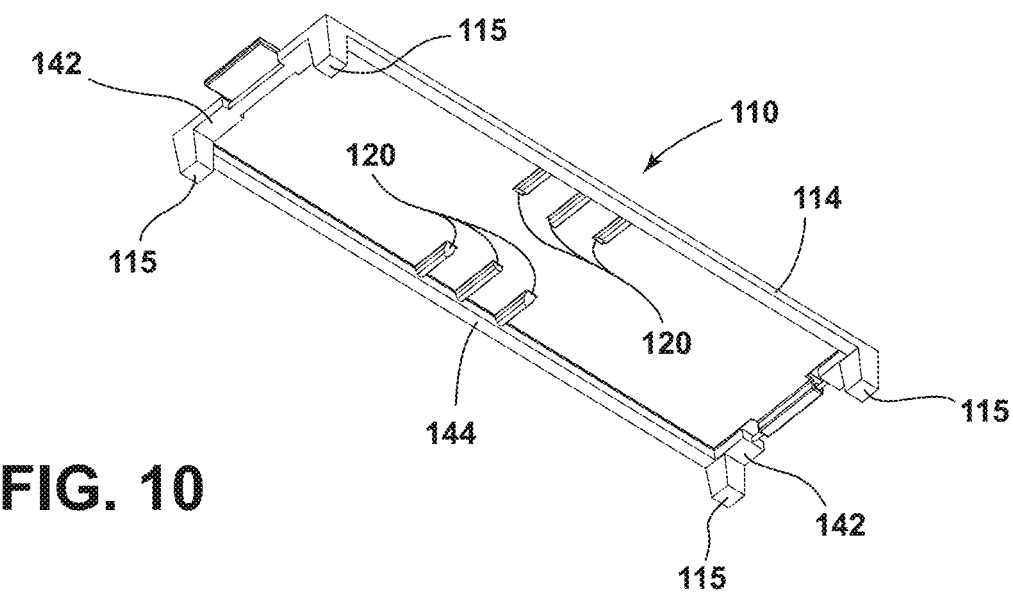
FIG. 10 is a bottom view of the combination griddle and grate of FIG. 8.
Figure 11:
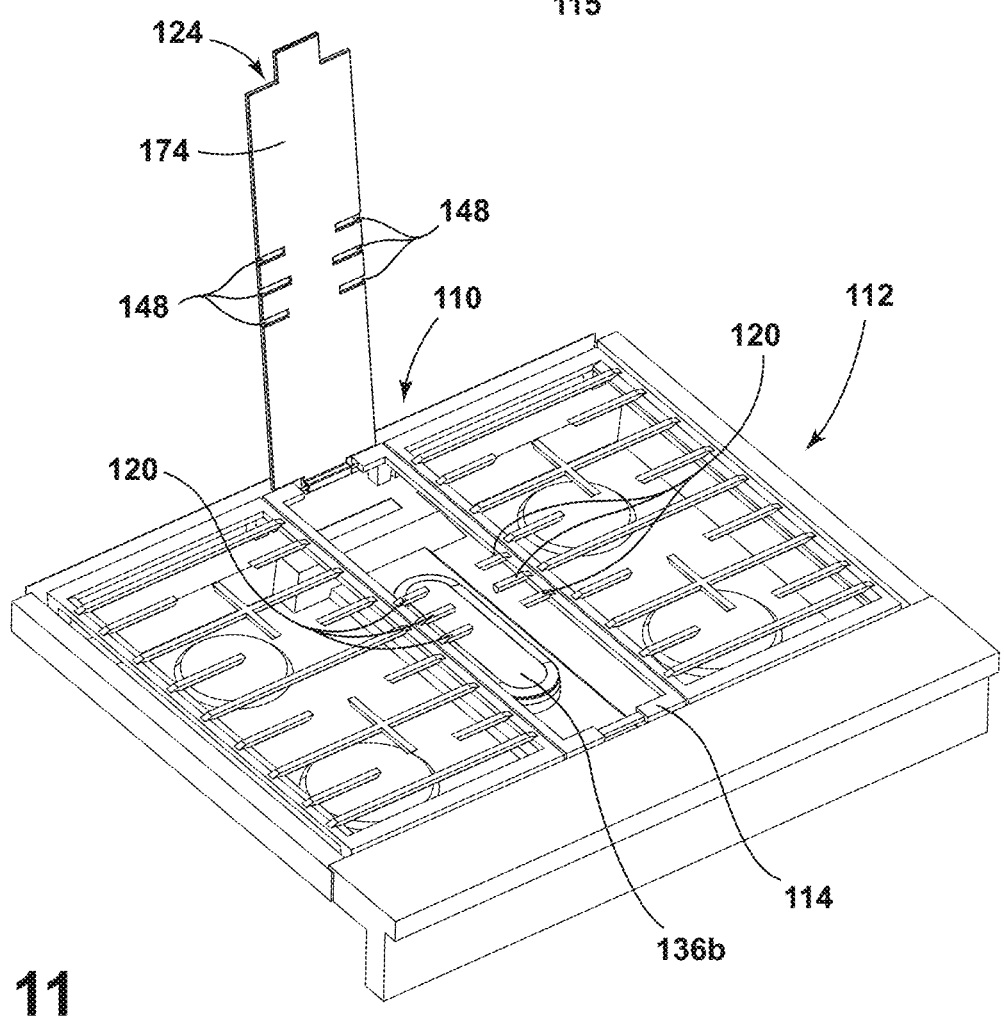
FIG. 11 is a perspective view of the combination griddle and grate of FIG. 8 with the griddle shown in a storage condition.

In an alternative example corresponding with another aspect of the disclosure, shown in FIGS. 8-14, the griddle body 124 can be configured to extend over the article supporting features 120. Unless otherwise noted, the combination grate and griddle assembly 110 of FIGS. 8-14 is otherwise generally similar to the previously-described example (FIGS. 1-7) and is numbered with similar reference numerals, increased by 100. As particularly shown in FIGS. 8-11, the base frame 114 can be configured with a plurality of article supporting features 120 extending inwardly from respective ones of the parallel long edge members 144 of the base frame 114 and defining respective upper surfaces 122. The griddle body 124 is hingedly connected with the base frame 114 for movement between the use position shown in FIGS. 8-10 and the storage position shown in FIG. 11. As shown in FIGS. 10 and 11, griddle body 124 defines a lower surface 174 opposite the cooking surface 126 with recesses 148 extending inwardly (or generally upward in the direction of the depictions in the figures) from the lower surface 174 and around the at least one article supporting feature 120. In this manner, the recesses 148 are defined in an similar manner to the cutouts 48, discussed above, but to not extend fully though the griddle body 124 and to not interrupt the cooking surface 126. In this manner, the cooking surface 126 of the griddle body 124 can be positioned above the upper supporting faces 122 of the article supporting features 120 when the griddle body 124 is in the use position. Additionally, the recesses 148 can be configured to rest on the upper faces 122 of the article supporting members 120 when the griddle body 124 is in the use position.

In the present example, the article supporting members 120 can extend toward each other in pairs defining a gap 146 therebetween, as illustrated in FIGS. 8-13, and particularly in FIG. 13. Because the recesses 148 do not extend fully though the griddle body 124 in the direction between the cooking surface 126 and the lower surface 174, the gaps 148 are not necessary to maintain a single-piece arrangement for the griddle body 124. Accordingly, the article supporting feature 120 can be configured as a single unit that extends across the open area 118 and is attached to both of the parallel long edge members 144, according to the examples shown in FIGS. 14A and 14B. In these arrangements, the article supporting member 120 can include various central grate portions 160, as desired to provide additional support for articles thereon and/or for aesthetic purposes.

Figure 15:
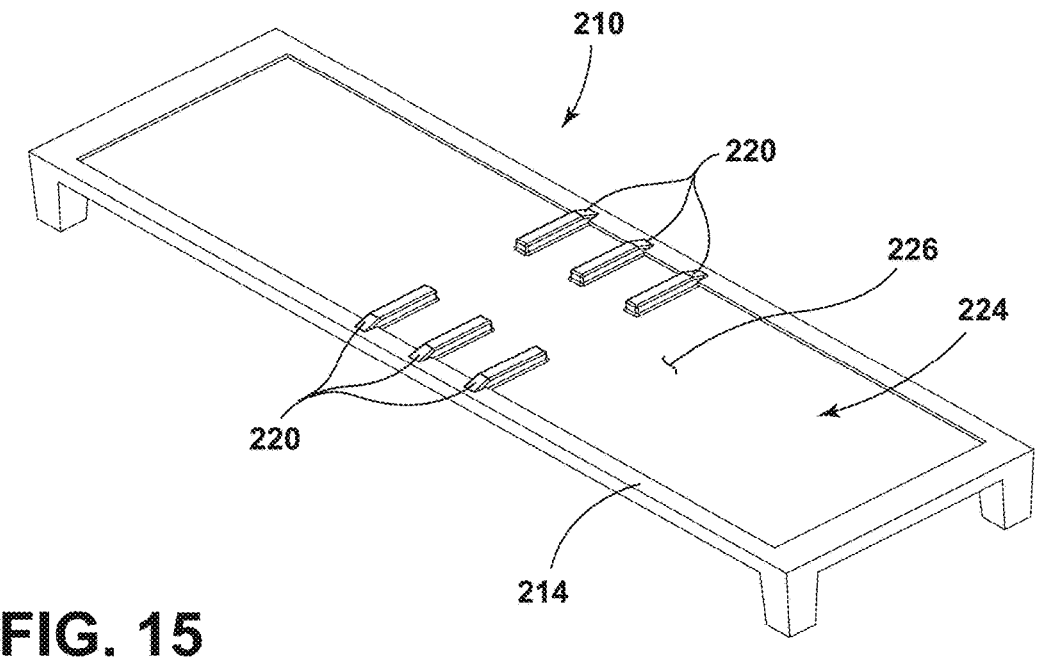
FIG. 15 is a perspective view of a further alternative combination griddle and grate.
Figure 16:
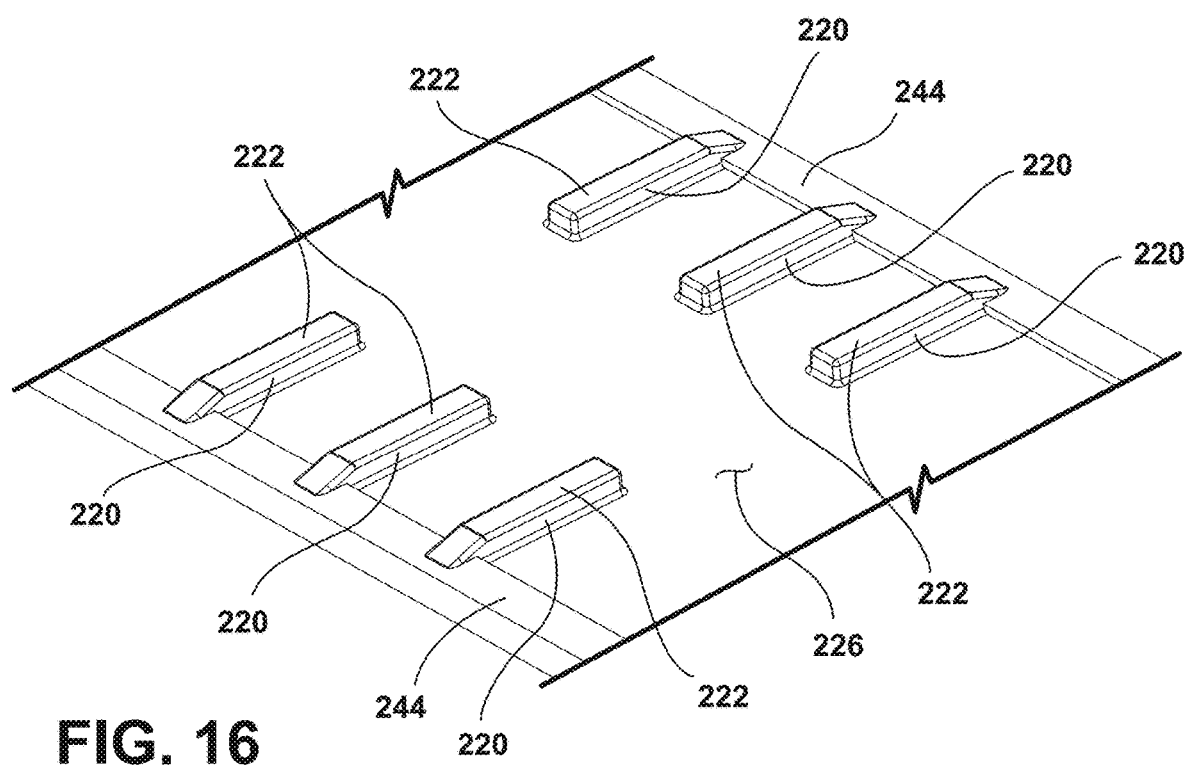
FIG. 16 is a detail view of a portion of the combination griddle and grate of FIG. 15.

A still further aspect of the disclosure is shown in the example of FIGS. 15 and 16. In particular, the article supporting features 220 and the griddle body 224 can be unitarily formed. In this manner, the cooking surface 226 of the griddle body 224 is positioned beneath the upper supporting surfaces 222 of the article supporting features 220. The base frame 214 extends around a perimeter of the combination grate and griddle 210 to define a central area 218 within which the cooking surface 226 of the griddle body 224 is positioned and into which the article supporting members 220 extend. In this manner, the combination grate and griddle unit 210 can be fully integrally formed with the base frame 214 being further integral with the article supporting members 220 and the griddle member 224, although other variations are possible. The cooking surface 226 can define at least one area 276 configured for directly cooking a food item thereon that is uninterrupted by any article supporting feature 220. In various additional examples, the article supporting members 220 can be configured according to the various additional examples thereof, including but not limited to those shown in FIGS. 4-6 and FIGS. 14A and 14B.

The invention disclosed herein is further summarized in the following paragraphs and is further characterized by combinations of any and all of the various aspects described therein.

According to another aspect of the present disclosure, a combination grate and griddle for a cooking hob includes a base frame extending around a perimeter of the combination grate and griddle to define an open central area. At least one article supporting feature is connected with the base, extends at least partially into the open central area, and defines an upper supporting face. A griddle body is connected with the base frame and extends within the open central area around the at least one article supporting feature. The griddle body defines a cooking surface spaced apart from the upper supporting face of the at least one article supporting feature.

The griddle body can be hingedly connected with the base frame so as to be moveable out of the open central area and into an upward-stored position.

The griddle body can define at least one cutout surrounding the at least one article supporting feature when the griddle body is within the open area, and the cooking surface of the griddle body can be positioned below the upper supporting face of the at least one article supporting feature.

The base frame can define two parallel short edges and two parallel long edges extending between the two parallel short edges, the griddle body can be hingedly connected with the base frame at a hinge positioned along a first one of the parallel short edges, and the griddle body defines a tab extending over a second of the two parallel short edges and partially supporting the griddle body within the central area of the base frame.

The at least one article supporting feature can be connected with the base at one of the two parallel long edges.

The at least one article supporting feature can be one of a plurality of article supporting features connected with the base at respective ones of the two parallel long edges to collectively define a grate portion of the combination grate and griddle configured for supporting a cooking article thereon.

The griddle body may define a lower surface opposite the cooking surface and at least one recess extending inwardly from the lower surface and around the at least one article supporting feature, and the cooking surface of the griddle body can be positioned above the upper supporting face of the at least one article supporting feature.

The base frame defines two parallel short edges and two parallel long edges extending between the two parallel short edges, and the griddle body can be hingedly connected with the base frame at a hinge positioned along a first one of the parallel short edges and can be supported within the open area engagement between the at least one recess and the upper supporting face of the at least one article supporting feature.

The at least one article supporting feature can be connected with the base at both of the parallel long edges so as to extend through the central open area of the base frame.

The base frame can further define a channel extending around at least a portion of an inner perimeter of the base frame that surrounds the open central area, and the griddle body can extend over at least a portion of the channel.

The griddle body can define a lip extending oppositely from the cooking surface that can be at least partially received within the channel.

The combination grate and griddle can further include a plurality of legs extending from the base frame to support the base frame above a burner of the cooking hob.

The article supporting feature and the griddle body can be unitarily formed with the cooking surface of the griddle body being positioned beneath the upper supporting surface of the article supporting feature.

According to yet another aspect, a cooking hob includes an upper cooktop surface, a cooking burner positioned on the upper cooktop surface, and a combination grate and griddle. The combination grate and griddle has a base frame defining two parallel short edges and two parallel long edges extending between the two parallel short edges and collectively extending around a perimeter of the combination grate and griddle to define an open central area. At least one article supporting feature is connected with the base from at one of the two parallel long edges, extends at least partially into the open central area and at least partially over the cooking burner, and defines an upper supporting face. A griddle body is hingedly connected with one of the two parallel short edges of the base frame and is moveable between a use position with the griddle body extending within the open central area around the at least one article supporting feature and over the cooking burner and a storage position such that the griddle body is positioned out of the open central area and away from the cooking burner.

The griddle body can define at least one cutout surrounding the at least one article supporting feature when the griddle body is within the open area, and the cooking surface of the griddle body can be positioned below the upper supporting face of the at least one article supporting feature.

The griddle body can define a tab extending over a second of the two parallel short edges and partially supporting the griddle body within the central area of the base frame when the griddle body is in the use position.

The at least one article supporting feature can be one of a plurality of article supporting features connected with the base at respective ones of the two parallel long edges to collectively define a grate portion of the combination grate and griddle configured for supporting a cooking article thereon.

The griddle body can define a lower surface opposite the cooking surface and at least one recess extending inwardly from the lower surface and around the at least one article supporting feature, and the cooking surface of the griddle body can be positioned above the upper supporting face of the at least one article supporting feature when the griddle body is in the use position.

The at least one article supporting feature can be connected with the base at both of the parallel long edges so as to extend through the central open area of the base frame.

According to yet another aspect, a combination grate and griddle for a cooking hob includes a base frame extending around a perimeter of the combination grate and griddle to define an open central area and a combined griddle and grate body supported within the open central area of the base frame, defining a cooking surface and at least one article supporting feature extending at least partially into the open central area, and defining an upper supporting face positioned above the cooking surface. The cooking surface defines at least one area configured for directly cooking a food item thereon that is uninterrupted by the at least one article supporting feature.

The combination combined griddle and grate body can be unitary with the base frame.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A combination grate and griddle for a cooking hob, comprising:
   a base frame extending around a perimeter of the combination grate and griddle to define an open central area;
   at least one article support connected with the base frame and extending at least partially into the open central area and defines an upper supporting face; and
   a griddle body connected with the base frame and extending within the open central area around the at least one article support, the griddle body defining a cooking surface spaced apart from the upper supporting face of the at least one article support and at least one cutout surrounding the at least one article support when the griddle body is within the central open area with the cooking surface of the griddle body being positioned below the upper supporting face of the at least one article support.

2. The combination grate and griddle of claim 1, wherein the griddle body is hingedly connected with the base frame so as to be moveable out of the open central area and into an upward-stored position.

3. The combination grate and griddle of claim 1, wherein:
   the base frame defines two parallel short edges and two parallel long edges extending between the two parallel short edges;
   the griddle body is hingedly connected with the base frame at a hinge positioned along a first one of the parallel short edges; and
   the griddle body defines a tab extending over a second of the two parallel short edges and partially supporting the griddle body within the central area of the base frame.

4. The combination grate and griddle of claim 3, wherein the at least one article support is connected with the base frame at one of the two parallel long edges.

5. The combination grate and griddle of claim 4, wherein the at least one article support is one of a plurality of article supports connected with the base frame at respective ones of the two parallel long edges to collectively define a grate portion of the combination grate and griddle configured for supporting a cooking article thereon.

6. The combination grate and griddle of claim 1, wherein:
   the base frame defines a channel extending around at least a portion of an inner perimeter of the base frame that surrounds the open central area; and
   the griddle body extends over at least a portion of the channel.

7. The combination grate and griddle of claim 6, wherein the griddle body defines a lip extending oppositely from the cooking surface and being at least partially received within the channel.

8. The combination grate and griddle of claim 1, further including a plurality of legs extending from the base frame to support the base frame above a burner of the cooking hob.

9. A cooking hob, comprising:
  an upper cooktop surface;
  a cooking burner positioned on the upper cooktop surface; and
  a combination grate and griddle, including:
    a base frame defining two parallel short edges and two parallel long edges extending between the two parallel short edges and collectively extending around a perimeter of the combination grate and griddle to define an open central area;
    at least one article support connected with the base frame from at one of the two parallel long edges, extending at least partially into the open central area and at least partially over the cooking burner, and defining an upper supporting face; and
    a griddle body hingedly connected with one of the two parallel short edges of the base frame and moveable between a use position with the griddle body extending within the open central area around the at least one article support and over the cooking burner and a storage position such that the griddle body is positioned out of the open central area and away from the cooking burner, the griddle body defining at least one cutout surrounding the at least one article support when the griddle body is within the open central area with a cooking surface of the griddle body being positioned below the upper supporting face of the at least one article support.

10. The cooking hob of claim 9, wherein the griddle body defines a tab extending over a second of the two parallel short edges and partially supporting the griddle body within the central area of the base frame when the griddle body is in the use position.

11. The cooking hob of claim 9, wherein the at least one article support is one of a plurality of article supports connected with the base frame at respective ones of the two parallel long edges to collectively define a grate portion of the combination grate and griddle configured for supporting a cooking article thereon.

* * * * *